(No Model.)

F. C. PRINDLE.
PORTABLE COMMODE.

No. 507,841. Patented Oct. 31, 1893.

WITNESSES:
John A. Rennie
C. Sedgwick

INVENTOR
F. C. Prindle
BY
Munn & Co.
ATTORNEYS.

UNITED STATES PATENT OFFICE.

FARRAND C. PRINDLE, OF HORNELLSVILLE, NEW YORK.

PORTABLE COMMODE.

SPECIFICATION forming part of Letters Patent No. 507,841, dated October 31, 1893.

Application filed February 10, 1893. Serial No. 461,755. (No model.)

*To all whom it may concern:*

Be it known that I, FARRAND C. PRINDLE, of Hornellsville, in the county of Steuben and State of New York, have invented a new and useful Improvement in Portable Commodes, of which the following is a full, clear, and exact description.

The ordinary chamber utensil is unsightly when exposed to view in a bedroom, and liable to permit the escape of noxious exhalations, if covered in the usual manner with an earthenware lid.

The object of my invention is to provide a novel constructed case or cover for the common earthenware chamber receptacle, which will when applied, completely envelop the vessel, and convert it into a portable commode, that may be given a sightly appearance, conceal the utensil, and hermetically seal it.

To this end, my invention consists in the peculiar construction and combination of parts, as hereinafter described and claimed.

Reference is to be had to the accompanying drawings forming a part of this specification, in which similar letters of reference indicate corresponding parts in all the figures.

Figure 1:
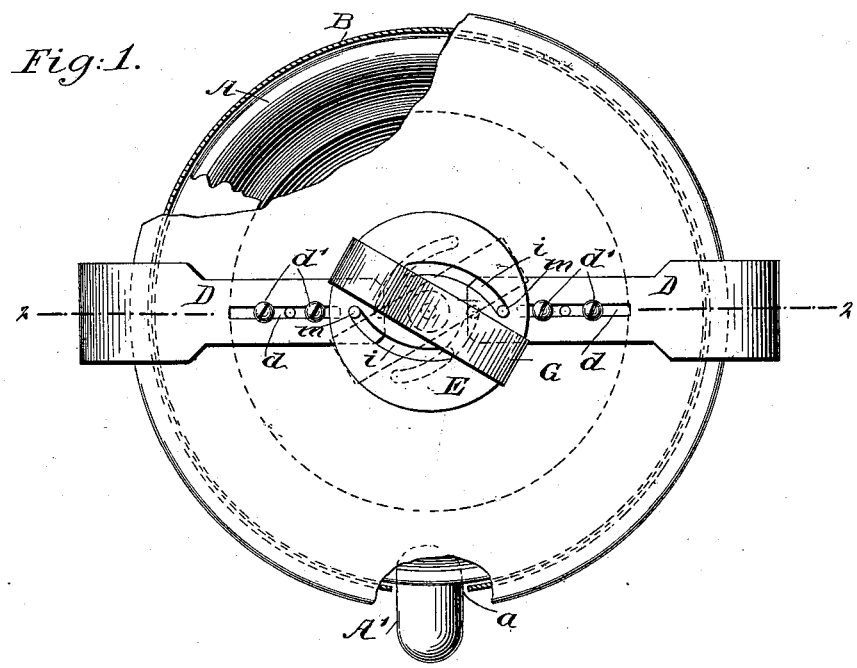
Figure 2:
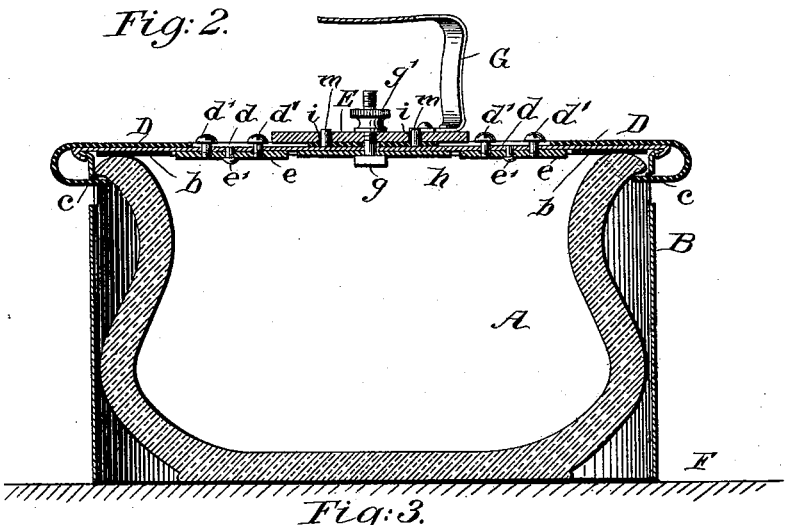
Figure 3:
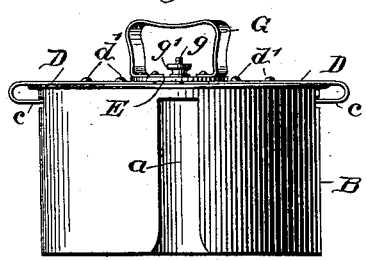

Figure 1 is a plan view of the device broken away to expose the interior vessel. Fig. 2 is a sectional side view on the line 2—2 in Fig. 1; and Fig. 3 is a perspective side view of the improvement.

The earthenware chamber vessel A, for which the improvement provides a cover, is of the usual shape, and therefore adapted to receive a casing of cylindrical form. The cover B, which embodies the novel features, consists of a cylindrical shell, preferably made of sheet metal, which is shaped by any suitable means, and is given such a diameter and height as will permit it to closely encompass the vessel A, a slot $a$, formed vertically in said wall of a proper height from its lower edge, being provided to allow the handle A' of the vessel A, to project slightly beyond the side wall when it is slid in the slot, as shown in Fig. 1. A cap-plate of circular form is secured on the side wall of the part B, by its edge, or said cap piece may be formed integrally therewith, if preferred, the relative height of the cover thus produced, being such as will permit the annular leather or gum joint $b$, that is on the inner surface of the cap-piece to have contact with the rounded upper edge of the vessel A, when the depending wall of the cover B is about in contact with the surface whereon the vessel is seated, such as the floor F, indicated in Fig. 2. Two similar clamping plates D, are furnished, which have their outer ends return-bent to produce hooks $c$, that are designed to pass through orifices oppositely formed in the cylindrical side walls of the part B, near the cap-piece of said part, and have impinging contact with the lower surface of the outwardly-curved edge usually formed on vessels such as A. The main portions of the clamping plates D, are placed in contact with the upper surface of the cap-piece of the cover B, and extend on a diametrical line toward each other, their facing ends being sufficiently separated to permit their free longitudinal movement in service.

Each of the plates D is longitudinally slotted at its transverse center, a proper distance from its inner end, which slots $d$ each receive two spaced guide pins or studs $d'$, that are shaped on top similar to a screw head, and have their other ends inserted through perforations in the cap-piece and into spacing plates $e$, which are thicker than the cap-piece, and the studs are adapted to be threaded into holes formed in the spacing plates for the reception of the screw-cut ends of the studs, said spacing plates being attached to the lower surface of the cap-piece of the cover B, at proper points, by rivets or screws $e'$.

Upon the adjacent ends of the clamping plates D, a preferably circular cam plate E, is imposed, which is centrally perforated to receive a screw-bolt $g$ that is inserted through aligning holes in the cap-piece of the cover B, and in a reinforce plate $h$, which is secured on the lower side of the cap-piece to stiffen it, said bolt being engaged where it projects above the cam plate by a nut $g'$, that is milled on the edge to permit it to be conveniently manipulated. The cam plate E, has two curved slots $i$, cut in it oppositely, the curvature of which slots is eccentric to the bolt $g$, that forms the pivot center of the cam plate, and two studs $m$ are projected from the inner portions of the clamping plates D, upwardly and through the cam slots $i$, said studs being an equal distance from the terminals of the hooks c on the other ends of the clamping plates.

Upon the cam plate E, a loop-shaped handle piece G, is secured by its ends, so that a rotatable movement of the handle will correspondingly move the cam plate, and by the action of its slots on the studs m, cause the clamping plates D to approach or recede from each other in accordance with the direction of movement given to the cam plate, and thereby lock the cover B upon the chamber vessel A, or release it as occasion may require, the nut g' on the center bolt g being manipulated to hold the parts firmly adjusted when the cover is locked on the vessel A.

It will be seen that from the form and dimensions given to the improved casing or cover B, and the novel means provided for its attachment air and liquid-tight upon the vessel A, that the two main portions A, B, together form a portable, hermetically sealed commode, which presents a neat external form, concealing the chamber vessel completely, and occupying no more floor room than the part A, alone.

It is claimed that the improvement conduces to health, by the close sealing of the vessel A, is convenient to transport by the handle G, to a place for the discharge of the contents of the vessel, which place may be a water closet, and thus avoid the usual annoyance in the transfer of excreted matter.

Having thus described my invention, I claim as new and desire to secure by Letters Patent—

1. A portable commode, comprising a vessel, a cylindrical casing therefor, closed at the top and adapted to press on the vessel, a rotatable handle on top of the casing, and a locking device engaged by said handle and adapted to grip the vessel laterally near the top when the handle is rotatably moved, substantially as described.

2. A portable commode, comprising a circular vessel having a radially projected top edge, a cylindrical casing having a flat cap-piece, a sealing joint within said cap-piece, a rotatable handle on the cap-piece, and a locking device connected to the handle and adapted to grip the vessel below its projected edge when the handle is rotatably moved, substantially as described.

3. A portable commode, comprising a chamber vessel circular in its body, having a radially projected top edge and a lateral handle, a cylindrical casing having a flat cap-piece, a sealing joint within said cap-piece, a slot in the side of the case adapted to receive the handle of the vessel, clamping plates having hooks at their outer ends entering holes in the side of the casing and engaging the radial edge of the chamber vessel, a rotatable handle on the casing, and a device engaged by the handle and adapted to oppositely slide the clamping plates when said handle is rotatably moved, substantially as described.

4. An incasing device for chamber vessels, comprising a cylindrical casing open at its lower end, having a vertical slot in one side and closed at its upper end with a flat cap-piece, flat clamping plates having hooks formed at their outer ends and projecting inwardly through opposite slots in the casing, guide studs projecting from the cap-piece into longitudinal slots in the inner portions of the clamping plates, a cam-plate having two curved slots oppositely formed therein, a central bolt loosely engaging the cam-plate, a nut therefor adapted to clamp said plate to the casing and clamping plates, studs projected from the inner ends of the clamping plates and passing through the curved slots in the cam plate and a looped handle secured by its ends on the cam plate, substantially as described.

FARRAND C. PRINDLE.

Witnesses:
W. C. SMITH,
JOHN S. JAMISON.